7520X
J. R. Wheeler.
Thrashing Mach.
Patented Apr. 9, 1833.
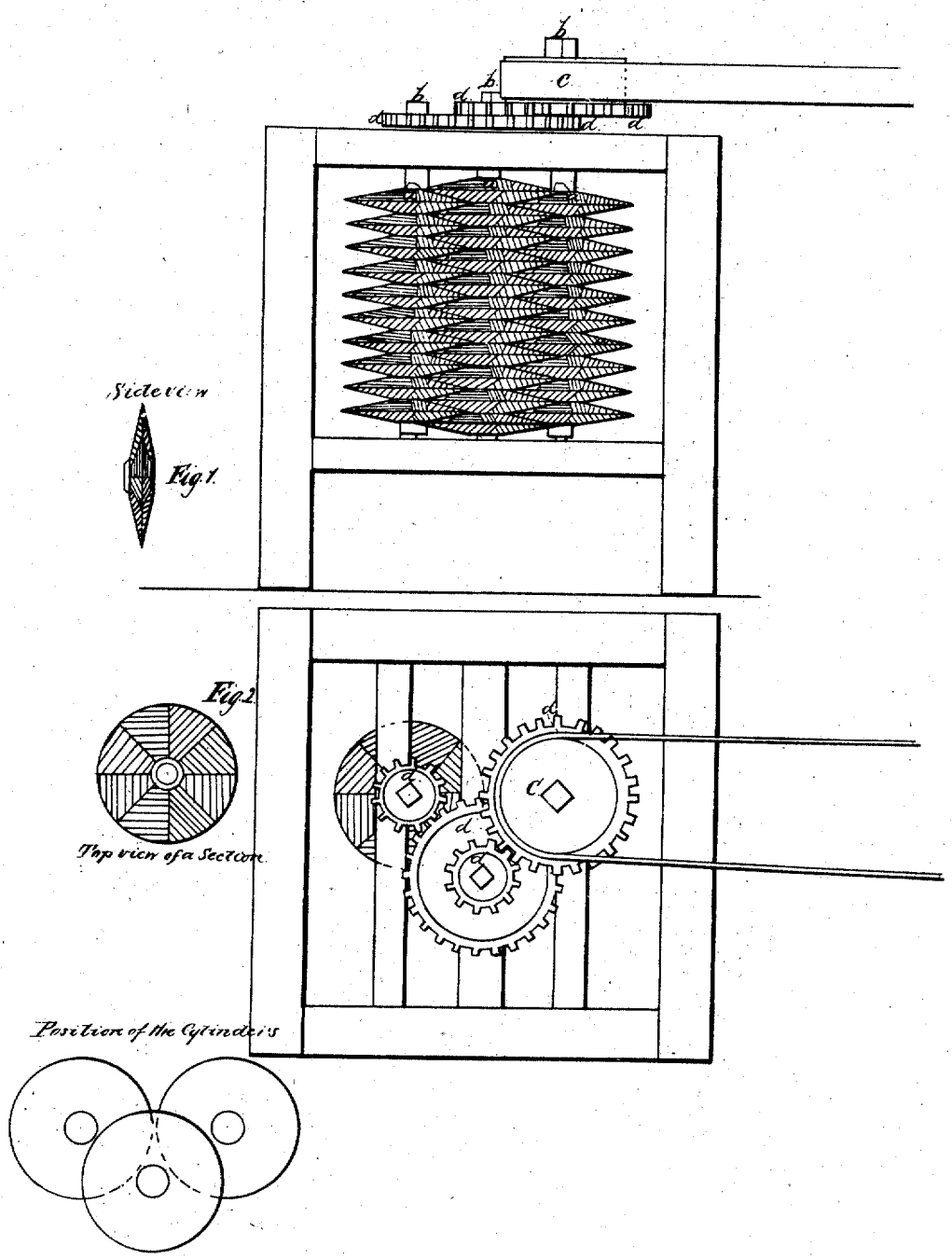

7520X April 9, 1833

April 9. 1833

John R Wheeler of Brighton Monroe Co. New York,
Letters Patent,

The Schedule referred to in these Letters Patent and making part of the same, containing a description in the words of the said John R Wheeler himself of his improvement in the Thrashing Machine, To all to whom these presents shall come, Be it known, that I John R Wheeler of Brighton in the County of Monroe and State of New York have invented a new and useful improvement not known or used before my application, known by the name and style of Wheelers Intersecting cylindrical machine for thrashing Wheat and other seeds, hulling Barley Rice &c. The following is a full and exact description of the construction and operation of the machine as invented by me.

A frame two and one half feet square & three feet high, with posts at the corners and rails near the top also within one foot of the bottom. In this frame stands three cylinders perpendicular, and mesh or run into each other, by concentrated circular grooves, and feather edged circular ribs. Each cylinder is composed of a number of sectional parts and is formed thus. A plate or ring of cast iron ten inches diameter with an eye or hollow centre from one third to one fifth of its diameter with a flange or rim to extend the eye to graduate the space when on the shaft. At the eye this plate or ring is three fourths of an inch thick terminating in a feather edge at the circumference. The lines which form this section, make an acute angled triangle, or an isosceles triangle, the two sides forming the acute angle, continued round the cylindrical shaft until they meet, are two endless inclined circular planes, together with the plane subtending the acute angle, which forms the eye and on one side extended, give the section required. And on these inclined circular planes, ribs or ridges are formed, making furrows and gutters like the coffee mill grinder, or the mill stone in a concentrated or octan

[illegible] 1520X

-gular tongined ridges and gutters. Each cylinder is composed of a
number of the above sections, and when closely connected on the shaft
are parallel among themselves forming equal channels & ridges. These
cylinders may be increased to any size or length, that fancy may dic-
-tate, the one adopted is from 1 foot to fifteen inches long, the small
est for practical use). Two of these cylinders are placed to run
rib to rib and so close as not to interfere. The third must intersect
its beveled edged rib, with the channels of both the other equally
leaving room only between the beveled groove and rib for the
grain to pass without breaking it. These cylinders when in oper-
-ation should severally move without interfering one with another
when geared by cog and spur wheel, to graduate their several move
-ments, so that when the power is applied either by water, steam, horse,
or otherwise to one of the receiving cylinders, the other will move
as two to one. The third which receives the straw after it passes
the others, moves as two to one with the second, All the above I claim together with the privi
-lege of varying the proportion of the said machine in construction
or making the cylinders of wrought or cast iron, or changing them
from a perpendicular to a horizontal position as my fancy may
dictate provided always I keep within the principles of my
invention. In testimony whereof I the said John R Wheeler
have hereunto set my hand and seal this twenty fifth day of
March One thousand eight hundred and thirty three.

Witnesses
J L D Mathies
William Whiting

John R Wheeler [seal]

Recd W.&C.

Patented 9th Apl 1833

(672 words)